(12) United States Patent
Broughton et al.

(10) Patent No.: US 9,402,073 B2
(45) Date of Patent: Jul. 26, 2016

(54) IMAGE PROCESSING FOR PRIVACY AND WIDE-VIEW USING ERROR DIFFUSION

(71) Applicant: SHARP KABUSHIKI KAISHA, Osaka (JP)

(72) Inventors: Benjamin John Broughton, Oxford (GB); Kenji Maeda, Osaka (JP); Tatsuo Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 442 days.

(21) Appl. No.: 13/962,164

(22) Filed: Aug. 8, 2013

(65) Prior Publication Data

US 2015/0042769 A1      Feb. 12, 2015

(51) Int. Cl.
| | |
|---|---|
| *H04N 13/04* | (2006.01) |
| *G09G 3/36* | (2006.01) |
| *G09G 3/00* | (2006.01) |
| *G09G 3/20* | (2006.01) |

(52) U.S. Cl.
CPC ........... *H04N 13/0447* (2013.01); *G09G 3/003* (2013.01); *G09G 3/36* (2013.01); *G09G 3/3648* (2013.01); *G09G 3/2059* (2013.01); *G09G 2320/028* (2013.01)

(58) Field of Classification Search
None
See application file for complete search history.

(56) References Cited

U.S. PATENT DOCUMENTS

| | | | |
|---|---|---|---|
| 6,870,643 B2 | 3/2005 | Thompson et al. | |
| 2009/0147125 A1* | 6/2009 | Muraki | G03B 13/00 348/345 |
| 2010/0156774 A1* | 6/2010 | Broughton | G09G 3/2018 345/88 |
| 2012/0154458 A1* | 6/2012 | Kay | G09G 3/003 345/690 |
| 2012/0169790 A1* | 7/2012 | Broughton | G06F 21/84 345/690 |

FOREIGN PATENT DOCUMENTS

| | | |
|---|---|---|
| GB | 2428152 A1 | 1/2007 |
| WO | WO 2009110128 A1 | 9/2009 |
| WO | WO 2011034208 | 3/2011 |
| WO | WO 2011034209 | 3/2011 |

OTHER PUBLICATIONS

Kim et al., "Enabling concurrent dual views on common LCD screens", *Proceedings of the 2012 ACM annual conference on Human Factors in Computing Systems* (CHI '12)., pp. 2175-2184 dated May 5-10, 2012.

* cited by examiner

*Primary Examiner* — Kate Luo
(74) *Attorney, Agent, or Firm* — Renner, Otto, Boisselle & Sklar, LLP

(57) ABSTRACT

A display device includes control electronics and a pixilated liquid crystal (LC) panel. The control electronics receives inputs of main image data for a main image and side image data for a side image. The control electronics outputs combined image data combining the main and side images such that an on-axis viewer perceives from the combined image the main image, and an off-axis viewer perceives from the combined image the side image. The output image data comprises data values chosen from a set of available output data values for the pixels selected from multiple sets of available data values depending on at least on the side image data. For a pixel currently being processed, the output data value is chosen from the selected set of available output data values for which a resulting luminance value is closest to a target luminance value for the current pixel.

16 Claims, 11 Drawing Sheets

Figure 5 (Prior Art)    Floyd Steinberg Dither

IMAGE PROCESSING FOR PRIVACY AND WIDE-VIEW USING ERROR DIFFUSION

TECHNICAL FIELD

The present invention relates to a display device, such as an active matrix liquid crystal display device, which is switchable between a public display mode and a private display mode.

BACKGROUND ART

Several types of display devices are known which are switchable between a public display mode and a private display mode, with varying degrees of additional cost over a standard display, ease of use and strength of privacy performance.

Devices incorporating such displays include, for example, mobile phones, tablet and laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in-car television screen while the car is in motion.

Image processing methods exist for producing a privacy effect in liquid crystal displays (LCDs) which, when in the private mode manipulate the image data in a manner dependent on a second, masking, image, and therefore cause that masking image to be perceived by the off-axis viewer when the modified image is displayed. Examples of such image processing methods are given in Powell et al., GB2428152A1, published on Jan. 17, 2007; Broughton et al., WO2009110128A1, published on Sep. 11, 2009; Broughton et al., WO2011034209, published on Mar. 24, 2011; and Broughton et al., WO201134208, published on Mar. 24, 2011. These methods provide an electronically switchable public/private display with no additional optical elements required, minimal additional cost, and satisfactory privacy performance. These methods all utilise the limited resolution of the human visual system by redistributing the luminance produced to the on-axis viewer by a group of neighbouring pixels within that group while maintaining the same overall luminance produced by the group as a whole.

In both WO2011034209 and WO2011034208, it is described how increasing the size of the group of pixels within which luminance is redistributed increases the maximum contrast of the masking image seen by the off-axis viewer. This is also illustrated in FIGS. 3 and 4 of the current application, which show the available off-axis luminance values as a function of on-axis luminance for methods using groups of two and four pixels respectively. WO2011034209 describes how the main image may be adaptively compressed according to its content so as to improve the privacy strength for particular image content.

However, while the off-axis image quality and therefore privacy strength may be increased by these methods, in none of the method described is the range of off-axis luminance values maximised for all on-axis luminance values. Also, for the fixed pattern of brighter and darker pixel produced by these methods in the resulting private mode image relative to the native display resolution, pre-processing of the main input image is required to minimise the appearance of resolution loss. This additional step increases the complexity and memory requirement of the process as a whole.

A method to produce a multi-view effect on a standard LCD using error diffusion based image processing methods, in which the pixel data values are optimised towards satisfying two or more images and two or more different viewing angles simultaneously, is described in Thompson et al., U.S. Pat. No. 6,870,643 issued on Mar. 10, 2002. However, the method of U.S. Pat. No. 6,870,643 requires a more complex error diffusion calculation using two or more weighted error values for the multiple images, and optimising simultaneously for them both. Another method to produce a similar effect using spatial multiplexing of the display pixels for the different images and using a reduced contrast range of data values for each set is described in Kim, et al., "Enabling concurrent dual views on common LCD screens", In *Proceedings of the* 2012 *ACM annual conference on Human Factors in Computing Systems* (CHI '12). pp 2175-2184, dated May 5-10, 2012. However, a fixed resolution loss due to the pre-defined multiplexing of the images is incurred with this method, as information for each image is represented by only half the display pixels.

SUMMARY OF INVENTION

It is therefore desirable to provide a high quality LCD display which has public and private mode capability, in which no modification to the LC layer or pixel electrode geometry is required from a standard display, has a substantially unaltered display performance (brightness, contrast resolution etc) in the public mode, and in the private mode has a strong privacy effect with a maximal range of achievable off-axis luminance for all on-axis luminance values, and a simply implemented image combination process.

The current invention provides image processing methods and display apparatuses that achieve such advantages by enhanced processing of image data in a multi-view liquid crystal display (LCD). Aspects of the invention include a display device including control electronics and a pixilated liquid crystal (LC) panel. The control electronics receives input of main image data for a main image, and side image data for a side image. The control electronics then outputs image data for a combined image of the main image and side image. In a private viewing mode, an on-axis viewer perceives from the combined image the main image and an off-axis viewer perceives from the combined image the side image.

The output image data for the combined image comprises output data values for pixels in a liquid crystal (LC) panel. The output data values are determined by selecting a set of available output data values from multiple sets of available output data values, and choosing the output data values from the selected set of available output data values. The selected set of available output data values is selected from among the multiple sets of available output data values depending on at least on the side image data. The output data values include signal data voltages for the pixels in the LC panel. For a given pixel currently being processed, the output data value is chosen from the selected set of available output data values for which a resulting luminance value of the current pixel is closest to a target luminance value for the current pixel. The target luminance value for the current pixel is based on the main image data for the current pixel and luminance errors from previously processed pixels, which are stored in a buffer and recalled from the buffer by the control electronics.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
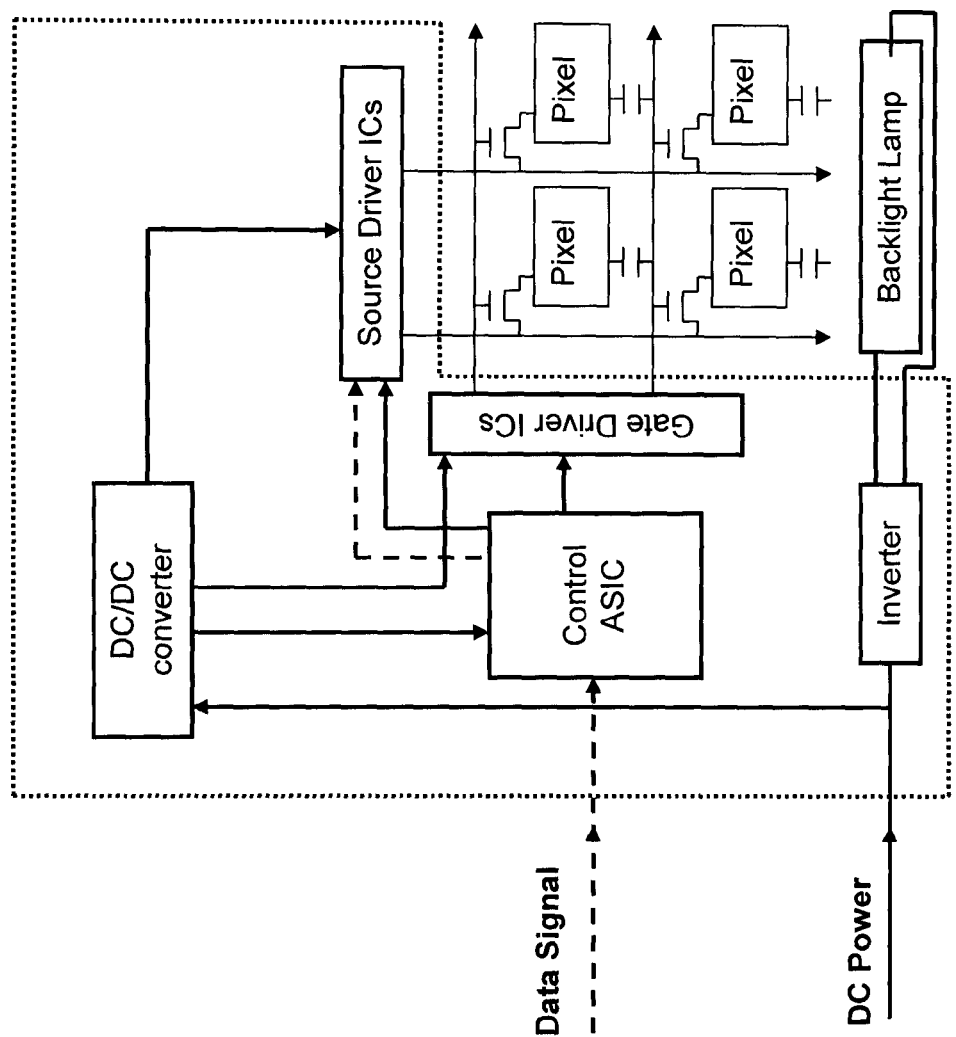
FIG. 1: is an example schematic of a standard LCD display panel and associated control electronics.

1. LCD Control Electronics
2. Liquid crystal panel
3. Principal viewer
4. Angular viewing range of the main image in the public mode
5. Off-axis viewer
6. Angular viewing range of the main image in the private mode.
7. Input main image data
8. Input side image data

DETAILED DESCRIPTION OF INVENTION

In a first exemplary embodiment, a display device has a standard (single wide-viewing (public) mode only) LCD display, with modified control electronics. An LCD display generally has several component parts including at least in part:
1. A backlighting unit to supply even, wide angle illumination to the panel.
2. Control electronics to receive digital image data and output analogue signal voltages for each pixel, as well as timing pulses and a common voltage for the counter electrode of all pixels. A schematic of a standard layout of an LCD control electronics is shown in FIG. 1 (See Ernst Lueder, Liquid Crystal Displays, Wiley and sons Ltd, 2001).
3. A liquid crystal (LC) panel, for displaying an image by spatial light modulation, including two opposing glass substrates, onto one of which is disposed an array of pixel electrodes and an active matrix array to direct the electronic signals, received from the control electronics, to the pixel electrodes. Onto the other substrate is usually disposed a uniform common electrode and colour filter array film. Between the glass substrates is contained a liquid crystal layer of given thickness, usually approximately 2-6 µm, which may be aligned by the presence of an alignment layer on the inner surfaces of the glass substrates. The glass substrates will generally be placed between crossed polarising films and other optical compensation films to cause the electrically induced alignment changes within each pixel region of the LC layer to produce the desired optical modulation of light from the backlight unit and ambient surroundings, and thereby generate the image.

Figure 2:
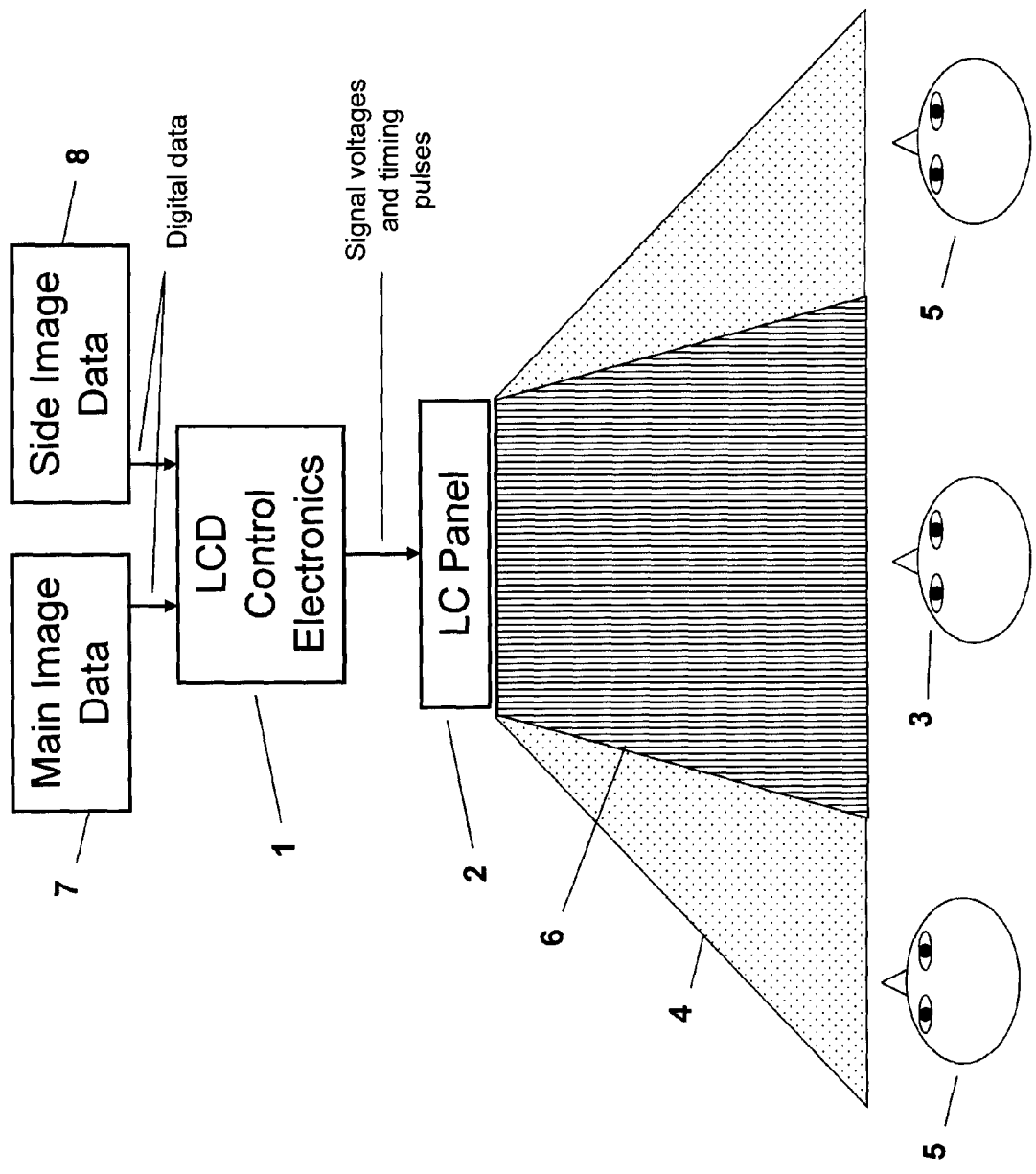
FIG. 2: is a schematic of a display with a switchable public/private viewing mode, according to an embodiment of the present invention.

An exemplary embodiment of a display device of the present invention is represented schematically in FIG. 2. Generally, the LCD Control Electronics 1 (referred to herein also as control electronics), will be configured specifically to the electro-optical characteristics of the LC panel 2, so as to output signal voltages which are dependent on the input image data in such a way as to optimise the perceived quality of the displayed image, i.e. resolution, contrast, brightness, response time etc, for the principal viewer 3, observing from a direction normal to the display surface (on-axis). The relationship between the input image data value for a given pixel and the observed luminance resulting from the display, referred to in the art as the "gamma curve", is determined by the combined effect of the data-value to signal voltage mapping of the display driver, and the signal voltage to luminance response of the LC panel.

The LC panel 2, will generally be configured with multiple LC domains per sub-pixel and/or passive optical compensation films so as to preserve the display gamma curve as closely as possible to the on-axis response for all viewing angles, thereby providing substantially the same high quality image to a wide viewing region 4. However, it is an inherent property of liquid crystal displays that their electro-optic response is angularly dependent and the off-axis gamma curve will inevitably differ from the on-axis one. As long as this does not result in contrast inversion or large colour-shift or contrast reduction, this does not generally result in an obvious perceived fault in the observed image for the off-axis viewer 5.

When the device of this embodiment is operating in the public mode, a set of input main image data 7 constituting a single image, is input to the control electronics 1 in each frame period. The control electronics then outputs a set of digital output data values, or analogue output signal data voltages, to the LC panel 2 (in the former case, the digital output data values are converted to analogue signal voltages by electronics included in the LC panel 2). Each of these signal voltages is directed by the active matrix array of the LC panel to the corresponding pixel electrode and the resulting collective electro-optical response of the pixels in the LC layer generates the image.

The control electronics has a single mapping of input pixel data value to output pixel data or signal voltage (Look-up table), which it applies to the process for all pixels. In some cases a different look-up table may be used for the red, green and blue sub-pixels of the display, but there is no variation in the mapping of input data to output voltage based on the spatial position of the pixel data within the image, or the pixel electrode within the display. Substantially the same image is then perceived by the on-axis viewer 3 and off-axis viewers 5, and the display can be said to be operating in a wide or public viewing mode.

When the device is operating in the private mode, two image datasets are input to the control electronics 1 in every frame period: input main image data, 7 constituting a main image, and input side image data 8 constituting a side image.

The control electronics then produces an output image comprising a set of signal data voltages, one data voltage for each pixel in the LC panel as described previously. However, the control electronics (display controller) now utilises an error diffusion or spatial dithering process, and the output data value or signal data voltage for each pixel in the LC panel, constituting a combined image, is selected from a set of available output data voltages based on one or more of:

a.) The data values for the corresponding pixel (in terms of spatial position in the image), in the main image.
b.) The difference, or error, in the output data value or signal voltage of neighbouring pixels in the image, and the data value or signal voltage specified for those pixels by the main image.
c.) The set of available output data values or signal voltages from which the output for each pixel is selected being determined either by the side image data value 8 for the pixel, or both the side image data value 8 and main image data value 7 for the pixel.

In this way, the standard LCD control electronics are modified to receive, and store in a buffer, two images, rather than one image, per frame period, and also to select a single output data or signal voltage per pixel from a set of available output values which is dependent on at least the second (side) image data set. The control electronics store in memory the resulting difference or error between the selected output data or signal voltage, and that which would have been output based on the main image only.

The output voltage from the control electronics 1 then causes the LC panel 2 to display a combined image which is the main image when observed by the main viewer 3, and simultaneously, due to the different gamma curve characteristic of the LC panel for the off-axis viewers 5, is perceived as the side image most prominently by these off-axis viewers 5. The perceived side image obscures and/or degrades the main image, securing the main image information to viewers within a restricted cone of angles 6 centred on the display normal.

In accordance with the above features, aspects of the invention include a method of processing image data in a multi-view liquid crystal display (LCD). In exemplary embodiments, the method includes the steps of inputting main image data for a main image to control electronics, inputting side image data for a side image to the control electronics, and outputting from the control electronics output image data for a combined image of the main image and side image, the output image data comprising output data values for pixels in a liquid crystal (LC) panel. The output data values are determined by selecting a set of available output data values from multiple sets of available output data values, and choosing the output data values from the selected set of available output data values. An on-axis viewer perceives from the combined image the main image, and an off-axis viewer perceives the combined image as the side image. For a current pixel, the output data value is chosen from the selected set of available output data values for which a resulting luminance value of the current pixel is closest to a target luminance value for the current pixel. Another aspect of the invention is a multi-view liquid crystal display (LCD) device including a liquid crystal panel including pixels for displaying image data, and control electronics that performs the described image processing.

In an exemplary embodiment, the error diffusion method utilised is the well-known Floyd-Steinberg spatial dithering method, and the set of available output values for each pixel is all output values (typically 0 to 255 for data values, or equivalent signal voltages) for pixels with spatially corresponding pixels in the input side image 8 which are bright, and only the maximum and minimum values 0 and 255 for pixels with spatially corresponding pixels in the input side image 8 which are dark. The input side image 8 may include only 1 bit per colour channel pixel data, or the control electronics may comprise an additional element to reduce the higher bit-depth side image to this reduced bit-depth to allow a straightforward classification of the side image data into "bright" and "dark" pixels.

Figure 5:
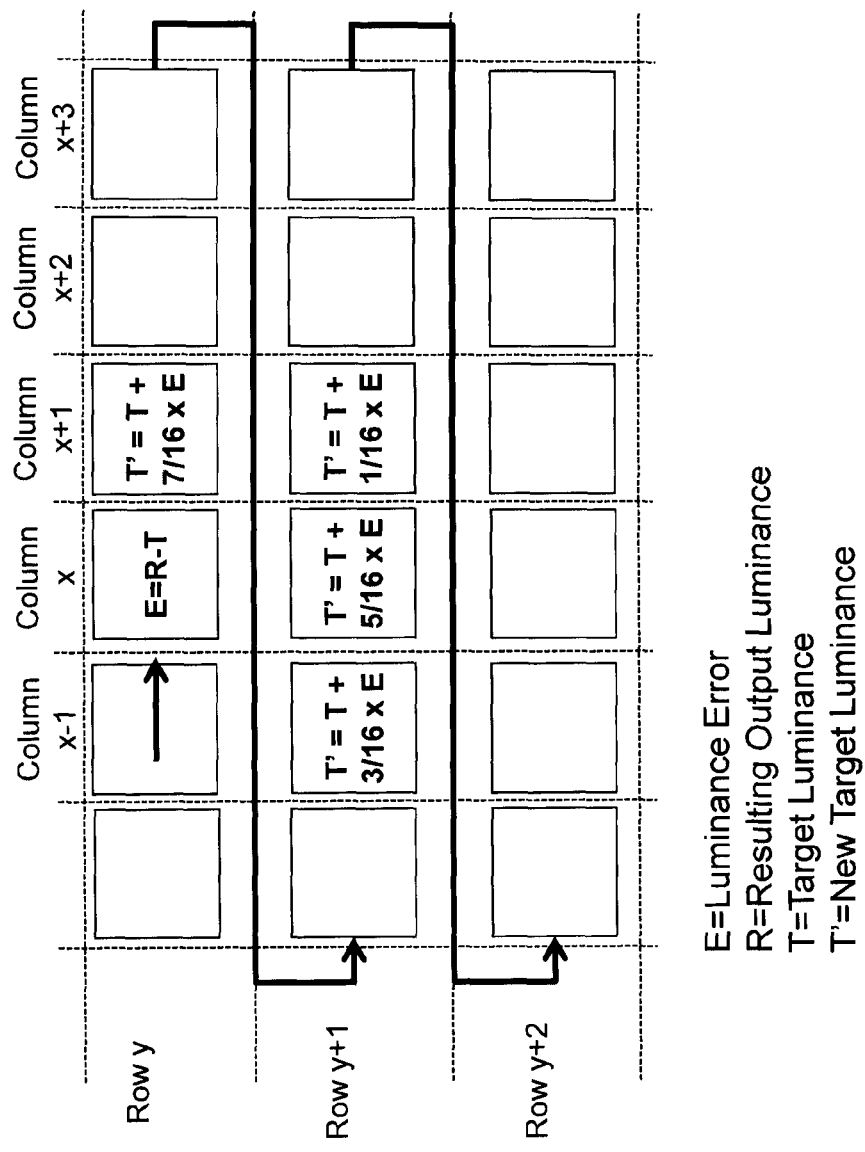
FIG. 5: is a schematic illustrating a conventional error diffusion image processing method.

The process of the Floyd-Steinberg dither is shown in FIG. 5. This figure shows that the process operates on the pixels of the image sequentially from left to right on each row, and one row at a time from top to bottom. Starting at the top-left pixel at the image, the output value of the available set closest to the target output value is selected, and the error between the target and output is divided into sixteenths, and added to the existing target values of neighbouring pixels to the right and below the current pixel in the proportions shown in the Figure. A buffer memory large enough to store target data values of at least one row plus two pixels is therefore required. In this exemplary embodiment, the target data values are gamma corrected so as to represent linear luminance increments, so the error diffusion more accurately maintains the overall luminance of the image region. The output data values then have the gamma function re-applied before being sent to the LC panel. However, this requires an additional conversion of the input main image data into luminance linear values, and then reconversion of the output values, so a simpler method which uses unmodified data values as the initial target values, and calculates and diffuses error in terms of data values only, may also be used. In such processing, the error and target luminance values are retained as image data values rather than converted to luminance values.

Figure 6:
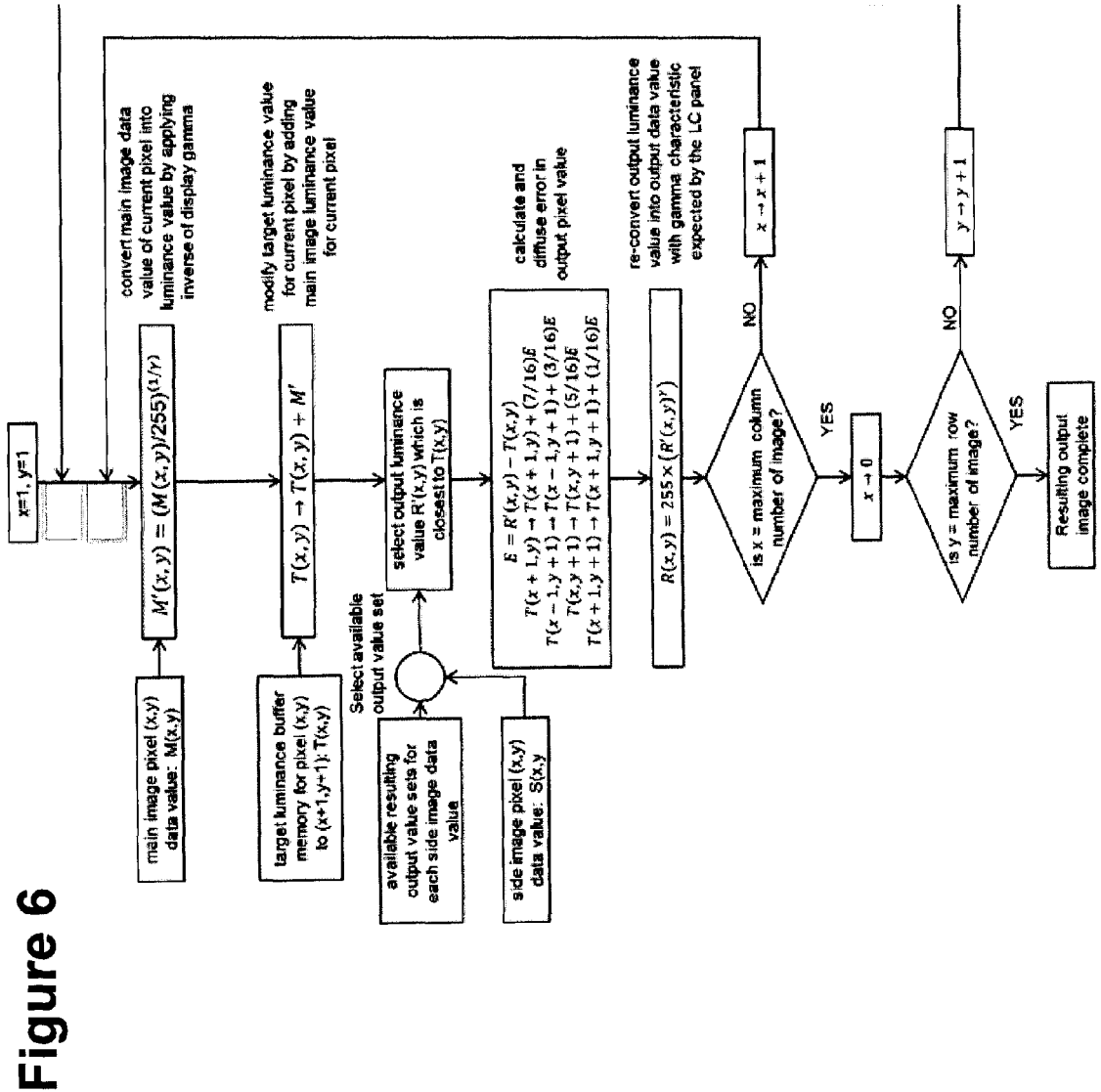
FIG. 6: is a process flow diagram showing an image processing method in accordance with an embodiment of the present invention.

The complete process of the described exemplary embodiment is illustrated in FIG. 6. FIG. 6 shows how each pixel of the output image is generated sequentially in the same order as the Floyd-Steinberg process. Generally, for a current pixel being processed, the output data value is chosen from the selected set of available output data values for which a resulting luminance value of the current pixel is closest to a target luminance value for the current pixel. As each pixel is processed in turn, the corresponding main image pixel data value is input to determine in part the target output luminance value. Also, the luminance errors from previously processed pixels in the image which have been diffused into the current pixel are recalled from the buffer memory, to be combined with the pixel luminance specified by the main image data to complete the target output luminance value. The available output image values are then determined in dependence on the side image. The output value which will produce the luminance closest to the target output luminance for that pixel is then selected as the output value for that pixel. The error between the resulting output luminance and the target is then calculated and diffused into the target luminance values for pixels yet to be processed according to the Floyd-Steinberg method. The process is then repeated for the next pixel in the sequence until all pixels in the image have been processed, and the next frame of image data is input.

It can be seen from this method that as the output image values are selected to minimise error for the main image only, the appearance of the main image to the on-axis viewer is well preserved. Spatial resolution loss is minimised as output values are not compromised by selecting to minimise error for a secondary image as well as the main image, as in U.S. Pat. No. 6,870,643. As the effective resolution loss incurred by the limited set of available output values allowed for some side image regions is immediately diffused into neighbouring pixels, all pixels of the display contain information representing the main image, unlike the method of Kim et al (CHI'12), in which only half the display pixels contain main image information, and no pre-blurring of the image to mitigate spatial resolution loss is required, as in WO2009110128A1, described also in WO2010047379 A1. Additionally, as the input side image data is used only to select the set of available output values, no expanded LUT with two or more entries for every combination of main image and side image data is required, as in WO2009110128. The present invention, therefore, has significant advantages over conventional image processing.

Figure 7:
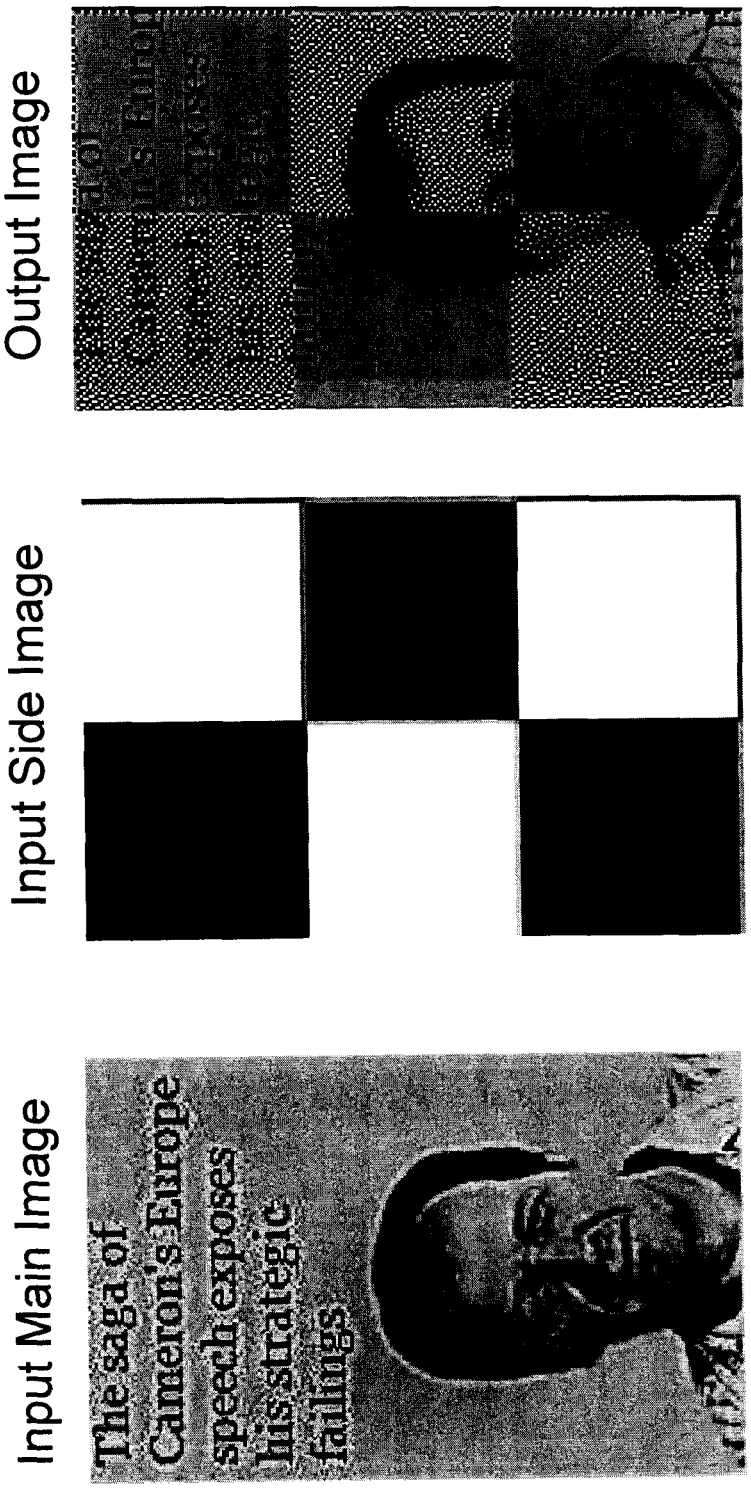
FIG. 7: is an illustration of the appearance of an image resulting from the process of this invention for an example input main and side image pair.

The appearance of the output image produced by this method, from an example input main and side image pair, is illustrated in FIG. 7. It can be seen that regions of the output image corresponding to dark regions of the side image have the characteristic randomised pattern of bright and dark pixels of the Floyd-Steinberg dither process, while regions of the output image corresponding to bright regions of the side image appear substantially unaltered form the main image. Displayed on a panel with sufficiently high resolution, the dither patterning of the dark side image regions will be too fine to be perceptible by a viewer at the typical viewing distance, and in the on-axis direction the image will appear substantially as the main image. However, off axis, due to the inherent viewing angle variation of the display gamma curve, the side image will be strongly visible and obscure the main image content.

Figure 3:
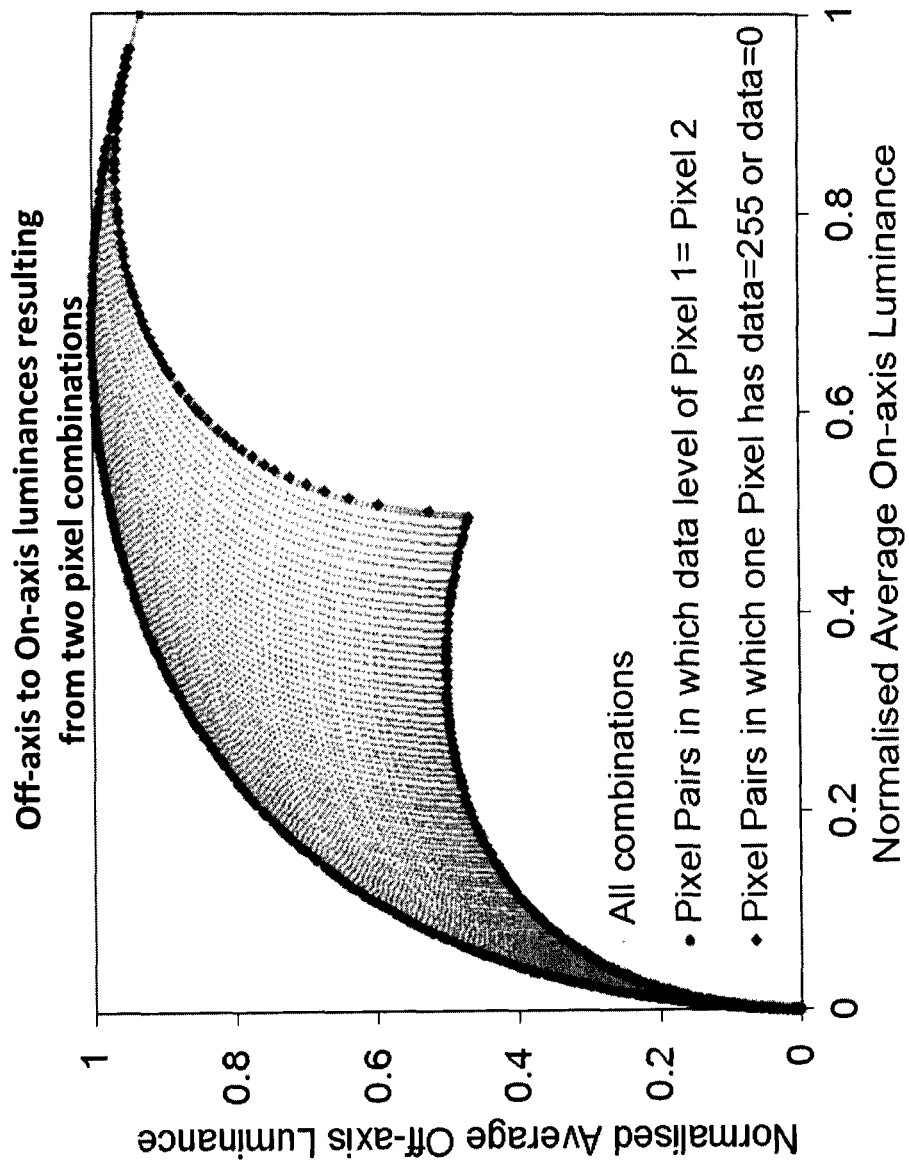
FIG. 3: is a plot of the available off-axis to on-axis luminance space producible by a conventional display, when using two pixel groupings.
Figure 4:
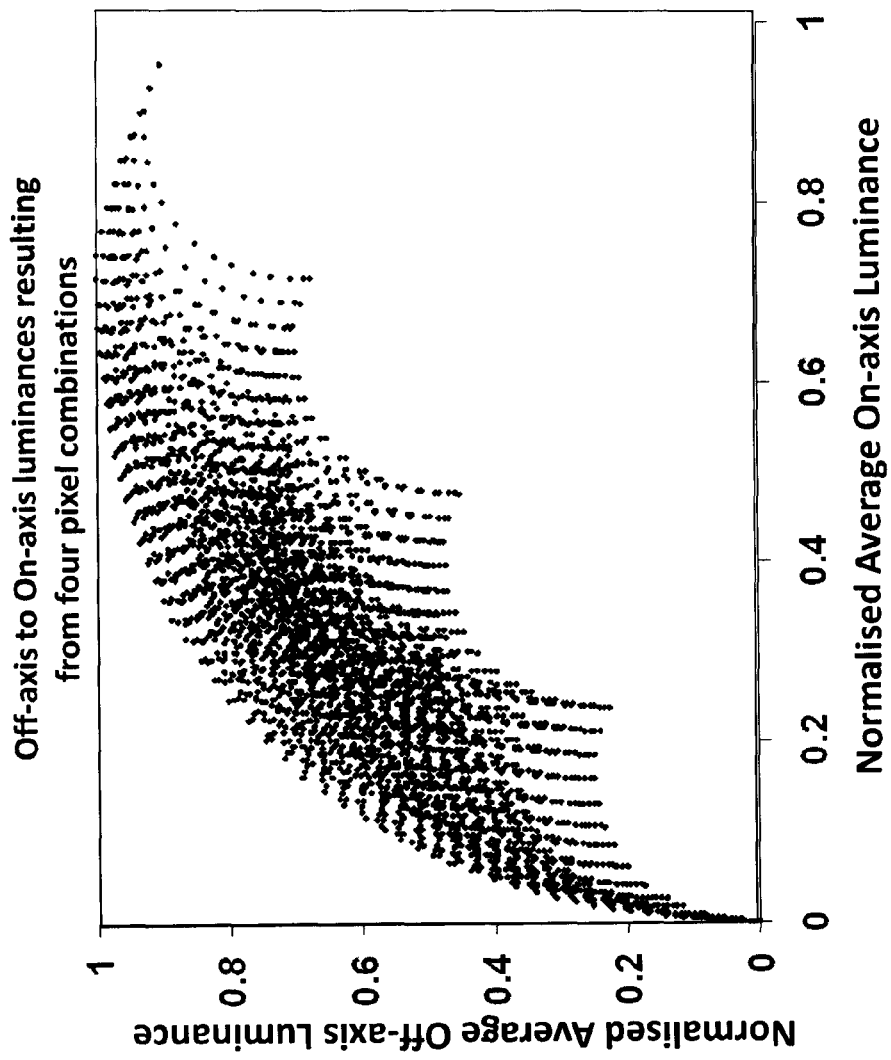
FIG. 4: is a plot of the available off-axis to on-axis luminance space producible by a conventional display, when using four pixel groupings.
Figure 8:
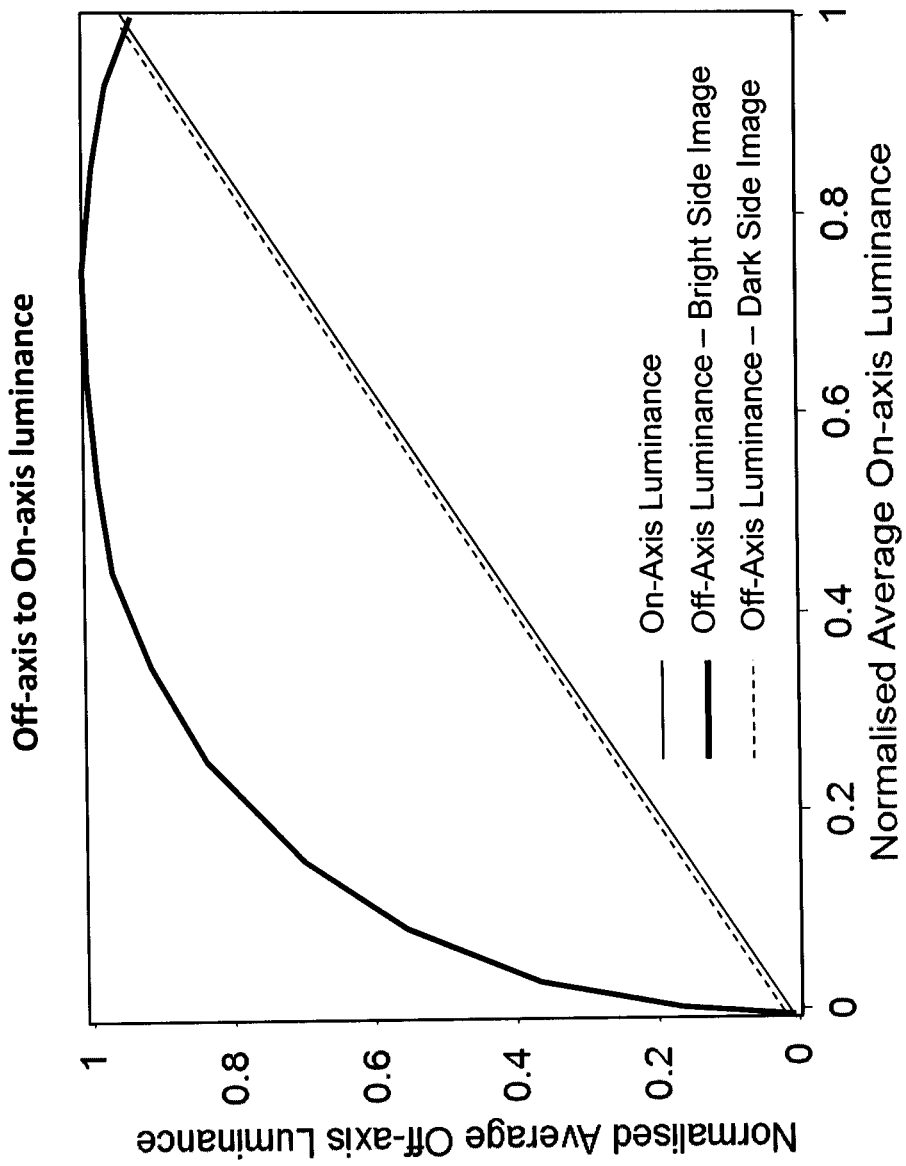
FIG. 8: is a graph showing the difference in off-axis luminance as a function of on-axis luminance for regions of an output image produced by the process of FIG. 7 corresponding to different side image values.

The on-axis and off-axis luminance for bright and dark side image regions produced by this method, as a function of on-axis luminance is shown in FIG. 8. This figure is equivalent to those produced by the prior art methods of WO2009110128 shown in FIGS. 3 and 4, and shows clearly the improved available off axis contrast for most on-axis luminance values afforded by the method of this embodiment, due to the normalized off-axis luminance for dark side image regions being identical to the on-axis luminance for all values.

An undesired result of the Floyds-Steinberg dithering process is that for main image regions with a uniform luminance near the maximum or minimum luminance, and available output values of only the maximum and minimum luminance, it can take many pixels to be processed before the accumulated error exceeds 50% luminance and a pixel of opposite output value to the surrounding output values is produced. This results in a very spare pattern of bright pixels in dark main image regions, and similarly sparsely patterned dark pixels in bright main image regions. Large image regions are therefore required to produce an average luminance matching the target, and the sparse patterning may be too visible to the on-axis viewer. This may be avoided, however, by allowing a larger set of available output values for pixels with a main image luminance near minimum or maximum, and dark side image values. This allows the accumulated luminance error for such image regions to be corrected within a smaller area of neighbouring pixels.

Figure 9:
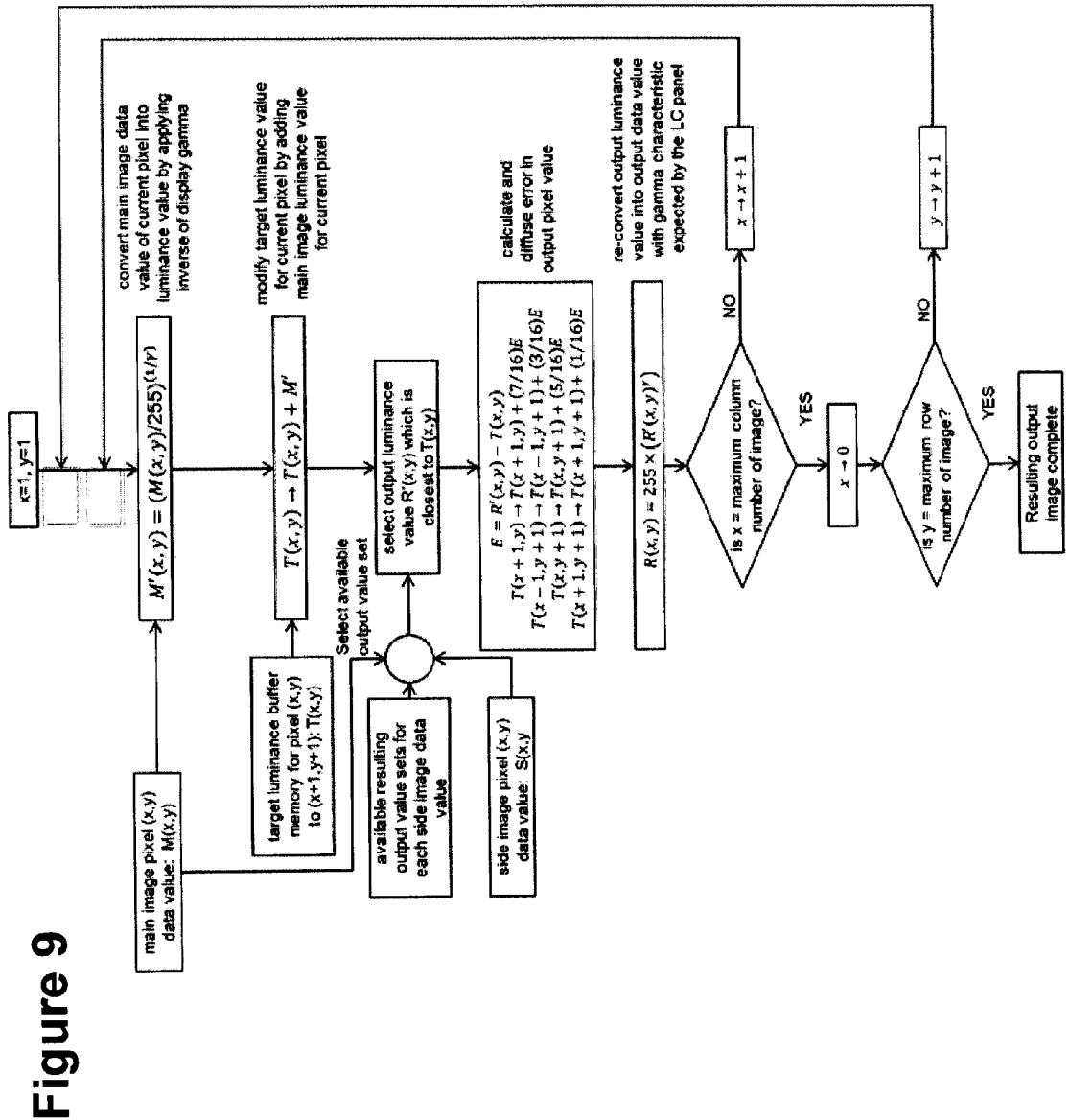
FIG. 9: is a process flow diagram showing an image processing method in accordance with a further embodiment of the present invention.
Figure 10:
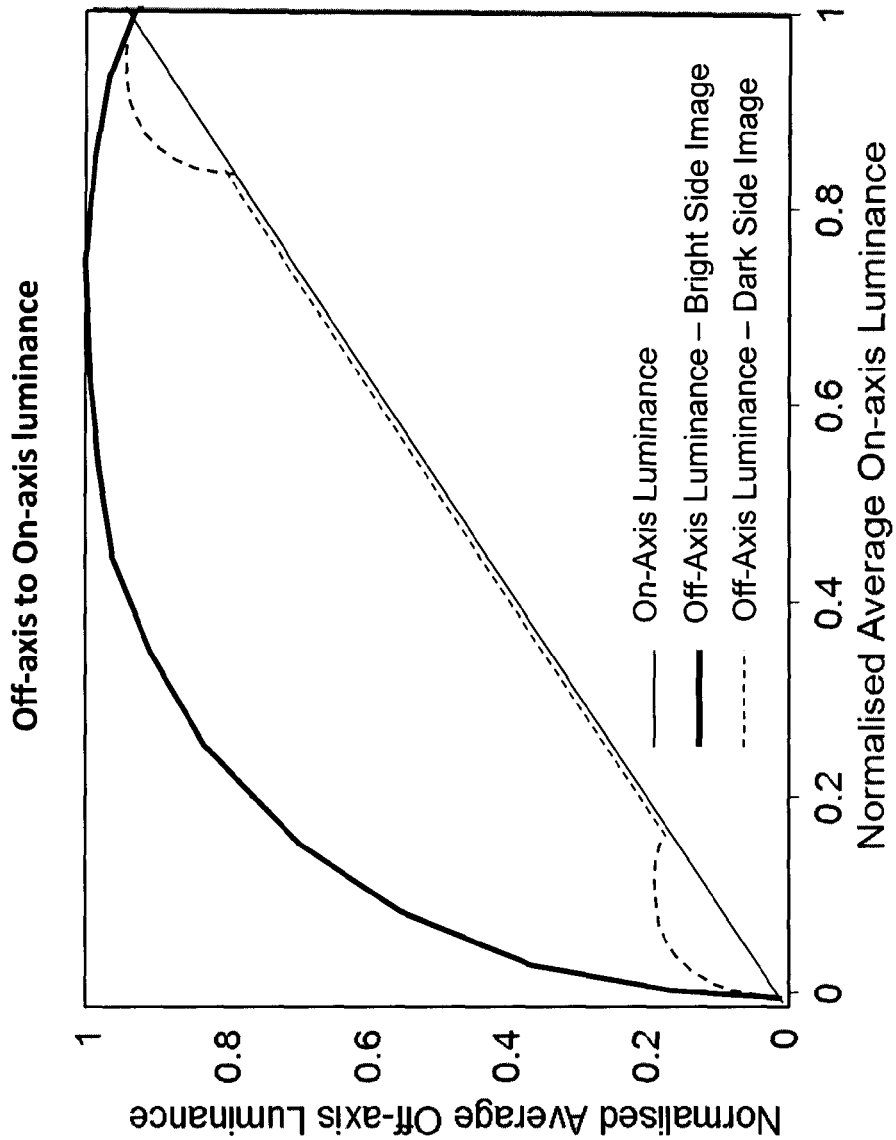
FIG. 10: is a graph showing the difference in off-axis luminance as a function of on-axis luminance for regions of an output image produced by the process of FIG. 9 corresponding to different side image values.

The process flow for a further embodiment using this method, in which the set of available output values is selected based on both main image and side image input values for the corresponding pixel, is shown in FIG. 9. The resulting off axis-to-on axis luminance plots for such a method are shown in FIG. 10. This figure illustrates that the sparsely patterned opposing pixel problem can be solved for the small expense of some privacy strength in dark and bright main image regions. In practice, it has been found that this reduced privacy strength is not noticeable for most typical image content.

Figure 11:
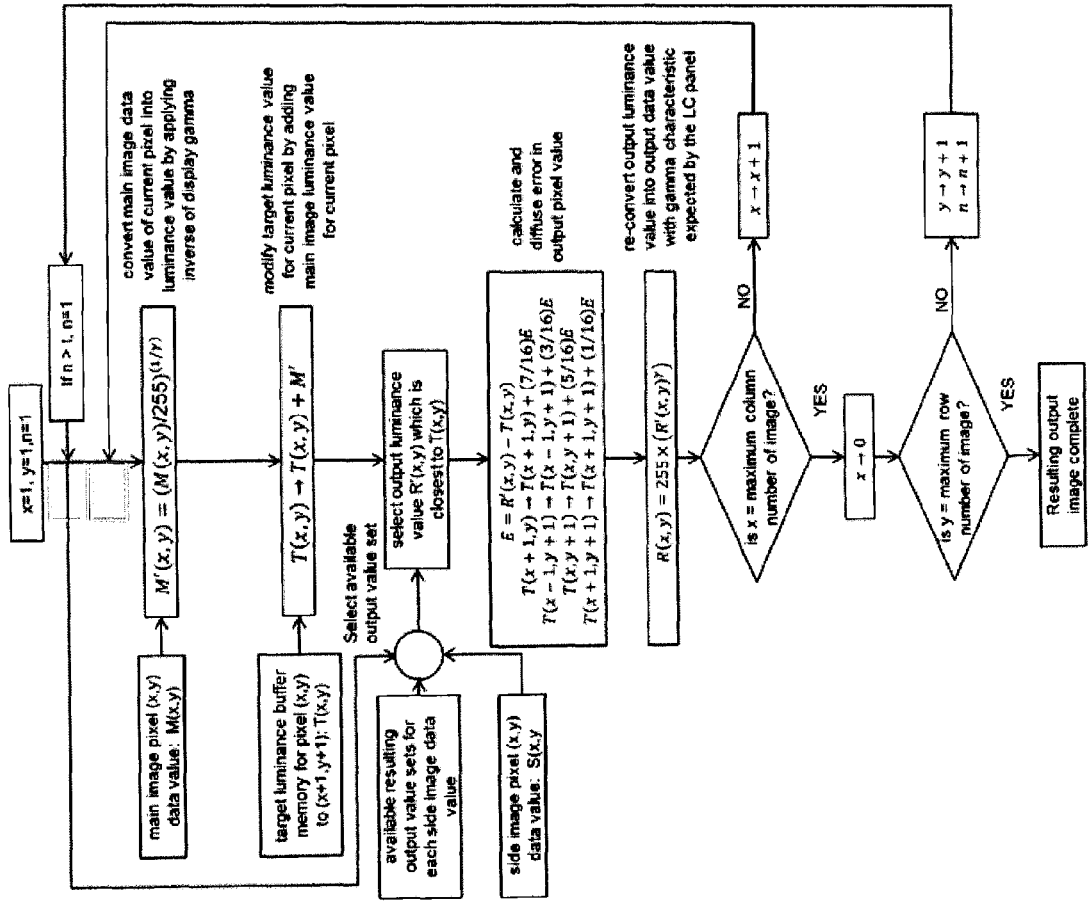
FIG. 11: is a process flow diagram showing an image processing method in accordance with a still further embodiment of the present invention.

In a still further embodiment, this same problem is avoided by allowing an expanded or increased set of available output values for a given fraction of the pixels in the image. FIG. 11 shows the process flow for an example of this embodiment in which every t-th pixel which is processed is provided with an increased set of available output values regardless of the side image data value for that pixel. In this embodiment, for a dark side image region, the available output values may be only the maximum and minimum values, except for t-th pixel to be processed which all output values may be available. A counter value n is incremented for every pixel processed, and reset to 1 when t is greater than n, the predetermined size for a group of pixel of which one may allowed any output value. This process therefore allows n to be set to provide the desired compromise between privacy strength and on-axis resolution appearance. Similarly, rather than using an incremented counter value, the spatial position coordinates (x and y in the FIGS. 6, 9 and 11) may be used to determine whether a pixel is to be allowed the increased set of available output values.

It should be noted that many variations in the details of the processing methods described in the above embodiments may be possible which fall within the scope of the invention. For example, any other known or yet to be developed dithering process other than the Floyd-Steinberg method may be used to diffuse the error in result and target output luminance. Any number of sets of available output values, and combinations of output values within those sets may be utilised, while remaining within the scope of the invention, as long as a secondary image is used in at least part of the selection of the utilised set for each pixel, or group of pixels, processed. The invention may be applicable to monochrome or colour composite displays. In the latter instance, where data values, target luminance' values etc of pixels have been described, the methods are equally applicable to colour sub-pixels, and the process described may be applied to each colour channel of the display separately, with error values being diffused to colour sub-pixels of the same type within neighbouring composite pixels. In another embodiment, the side image data is pre-processed to reduce the number of data values it contains to two per color channel before determining the output data values.

In accordance with the above, an aspect of the invention is a method of processing image data in a multi-view liquid crystal display (LCD) device. Embodiments of the method of processing image data include inputting main image data for a main image to control electronics, inputting side image data for a side image to the control electronics, and outputting from the control electronics output image data for a combined image of the main image and side image, the output image data comprising output data values for pixels in a liquid crystal (LC) panel. The output data values are determined by selecting a set of available output data values from multiple sets of available output data values and choosing the output data values from the selected set of available output data values. For a current pixel, the output data value is chosen from the selected set of available output data values for which a resulting luminance value of the current pixel is closest to a target luminance value for the current pixel.

An on-axis viewer perceives from the combined image the main image and an off-axis viewer perceives from the combined image the side image.

In exemplary embodiments of the method of processing image data, the output data values comprise an output signal data voltage for each pixel in the LC panel, and the selected set of available output data values is selected from among the multiple sets of available output data values depending on at least on the side image data.

In exemplary embodiments of the method of processing image data, the target luminance value for the current pixel is based on the main image data for the current pixel and luminance errors from previously processed pixels.

In exemplary embodiments of the method of processing image data, the luminance errors from the previously processed pixels are stored in a buffer and recalled from the buffer by the control electronics to determine the target luminance value of the current pixel.

In exemplary embodiments of the method of processing image data, the error and target luminance values are retained as image data values rather than converted to luminance values.

In exemplary embodiments of the method of processing image data, an error between the resulting luminance value of the current pixel and the target luminance value of the current pixel is diffused into target luminance values for pixels yet to be processed.

In exemplary embodiments of the method of processing image data, the selected set of available output data values is selected from among the multiple sets of available output data values depending on both the side image data and the main image data.

In exemplary embodiments of the method of processing image data, the selected set of available output data values is selected from among the multiple sets of available output data values depending on the side image data value, and either a number of a pixel in a sequence of pixels being processed or a position of the pixel in the main image.

In exemplary embodiments of the method of processing image data, the selected set of available output data values for each pixel is all output values for pixels that spatially correspond to pixels in the input side image which are bright, and only maximum and minimum values for pixels that spatially correspond to pixels in the input side image which are dark.

In exemplary embodiments of the method of processing image data, the multiples sets of available output data values are based on one or more of: data values for the corresponding pixel in the main image; a difference or error in the output data value of neighbouring pixels in the main image, and the data value or signal voltage specified for those pixels by the main image; and a side image data value for the pixel, or both the side image data value and the main image data value for the pixel.

In exemplary embodiments of the method of processing image data, a fraction of the pixels is provided with an increased set of available output data values.

In exemplary embodiments of the method of processing image data, each t-th pixel is provided with an increased set of available output data values, the t-th pixel being determined based on a counter value.

In exemplary embodiments of the method of processing image data, spatial coordinates in the LC panel determine whether a pixel is to be provided with the increased set of available output data values.

In exemplary embodiments of the method of processing image data, the side image data is pre-processed to reduce the number of data values it contains to two per color channel before determining the output data values.

Another aspect of the invention is a multi-view liquid crystal display (LCD) device. Embodiments of the LCD device include a liquid crystal panel including pixels for displaying image data, and control electronics configured to receive input main image data for a main image and input side image data for a side image. The control electronics is configured to output from the control electronics output image data for a combined image of the main image and side image, the output image data comprising output data values for pixels in a liquid crystal (LC) panel. The control electronics is configured to determine the output data values by selecting a set of available output data values from multiple sets of available output data values and choosing the output data values from the selected set of available output data values. An on-axis viewer perceives from the combined image the main image and an off-axis viewer perceives from the combined image the side image.

In exemplary embodiments of LCD device, the LCD device further includes a buffer for storing target luminance values for the pixels of the LC panel, wherein for a current pixel, the output data value is chosen from the selected set of available output data values for which a resulting luminance value of the current pixel is closest to a target luminance value for the current pixel.

In exemplary embodiments of LCD device, the target luminance value for the current pixel is based on the main image data for the current pixel and luminance errors from previously processed pixels, and the luminance errors from the previously processed pixels are stored in the buffer and recalled from the buffer by the control electronics to determine the target luminance value of the current pixel.

In exemplary embodiments of LCD device, an error between the resulting luminance value of the current pixel and the target luminance value of the current pixel is diffused into target luminance values for pixels yet to be processed.

INDUSTRIAL APPLICABILITY

The embodiments of this invention are applicable to many display devices, and a user may benefit from the option of a privacy function on their normally wide-view display for use in certain public situations where privacy is desirable. Examples of such devices include mobile phones, Personal Digital Assistants (PDAs), tablet and laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

The invention claimed is:

1. A method of processing image data in a multi-view liquid crystal display (LCD) device comprising the steps of:
    inputting main image data for a main image to control electronics;
    inputting side image data for a side image to the control electronics; and
    outputting from the control electronics output image data for a combined image of the main image and side image, the output image data comprising output data values for pixels in a liquid crystal (LC) panel,
    wherein the output data values are determined by selecting a set of available output data values from multiple sets of available output data values and choosing the output data values from the selected set of available output data values;

wherein an on-axis viewer perceives from the combined image the main image and an off-axis viewer perceives from the combined image the side image;

wherein for a current pixel, the output data value is chosen from the selected set of available output data values for which a resulting luminance value of the current pixel is closest to a target luminance value for the current pixel; and wherein the target luminance value for the current pixel is based on the main image data for the current pixel and luminance errors from previously processed pixels.

2. The method of processing image data of claim 1, wherein the output data values comprise an output signal data voltage for each pixel in the LC panel, and the selected set of available output data values is selected from among the multiple sets of available output data values depending on at least on the side image data.

3. The method of processing image data of claim 2, wherein the selected set of available output data values is selected from among the multiple sets of available output data values depending on both the side image data and the main image data.

4. The method of processing image data of claim 2, wherein the selected set of available output data values is selected from among the multiple sets of available output data values depending on the side image data value, and either a number of a pixel in a sequence of pixels being processed or a position of the pixel in the main image.

5. The method of image processing of claim 1, wherein the luminance errors from the previously processed pixels are stored in a buffer and recalled from the buffer by the control electronics to determine the target luminance value of the current pixel.

6. The method of processing image data of claim 5, wherein the error and target luminance values are retained as image data values rather than converted to luminance values.

7. The method of image processing of claim 5, wherein an error between the resulting luminance value of the current pixel and the target luminance value of the current pixel is diffused into target luminance values for pixels yet to be processed.

8. The method of processing image data of claim 1, wherein the selected set of available output data values for each pixel is all output values for pixels that spatially correspond to pixels in the input side image which are bright, and only maximum and minimum values for pixels that spatially correspond to pixels in the input side image which are dark.

9. The method of processing image data of claim 1, wherein the multiples sets of available output data values are based on one or more of:

data values for the corresponding pixel in the main image;

a difference or error in the output data value of neighbouring pixels in the main image, and the data value or signal voltage specified for those pixels by the main image; and a side image data value for the pixel, or both the side image data value and the main image data value for the pixel.

10. The method of processing of image data of claim 1, wherein a fraction of the pixels is provided with an increased set of available output data values.

11. The method of processing of image data of claim 10, wherein each t-th pixel is provided with an increased set of available output data values, the t-th pixel being determined based on a counter value.

12. The method of processing of image data of claim 10, wherein spatial coordinates in the LC panel determine whether a pixel is to be provided with the increased set of available output data values.

13. The method of processing of image data of claim 1, wherein the side image data is pre-processed to reduce the number of data values it contains to two per color channel before determining the output data values.

14. A multi-view liquid crystal display (LCD) device comprising:

a liquid crystal panel including pixels for displaying image data; and control electronics configured to receive input main image data for a main image and input side image data for a side image;

wherein the control electronics is configured to output from the control electronics output image data for a combined image of the main image and side image, the output image data comprising output data values for pixels in a liquid crystal (LC) panel, wherein the control electronics is configured to determine the output data values by selecting a set of available output data values from multiple sets of available output data values and choosing the output data values from the selected set of available output data values; and wherein an on-axis viewer perceives from the combined image the main image and an off-axis viewer perceives from the combined image the side image;

further comprising a buffer for storing target luminance values for the pixels of the LC panel, wherein for a current pixel, the output data value is chosen by the control electronics from the selected set of available output data values for which a resulting luminance value of the current pixel is closest to a target luminance value for the current pixel; and wherein the control electronics is configured to determine the target luminance value for the current pixel is based on the main image data for the current pixel and luminance errors from previously processed pixels.

15. The LCD device of claim 14, wherein the luminance errors from the previously processed pixels are stored in the buffer and recalled from the buffer by the control electronics to determine the target luminance value of the current pixel.

16. The LCD device of claim 15, wherein an error between the resulting luminance value of the current pixel and the target luminance value of the current pixel is diffused into target luminance values for pixels yet to be processed.

* * * * *